Feb. 4, 1941.  D. H. LITTLETON  2,230,755
MATERIAL HANDLING APPARATUS
Filed Sept. 11, 1939
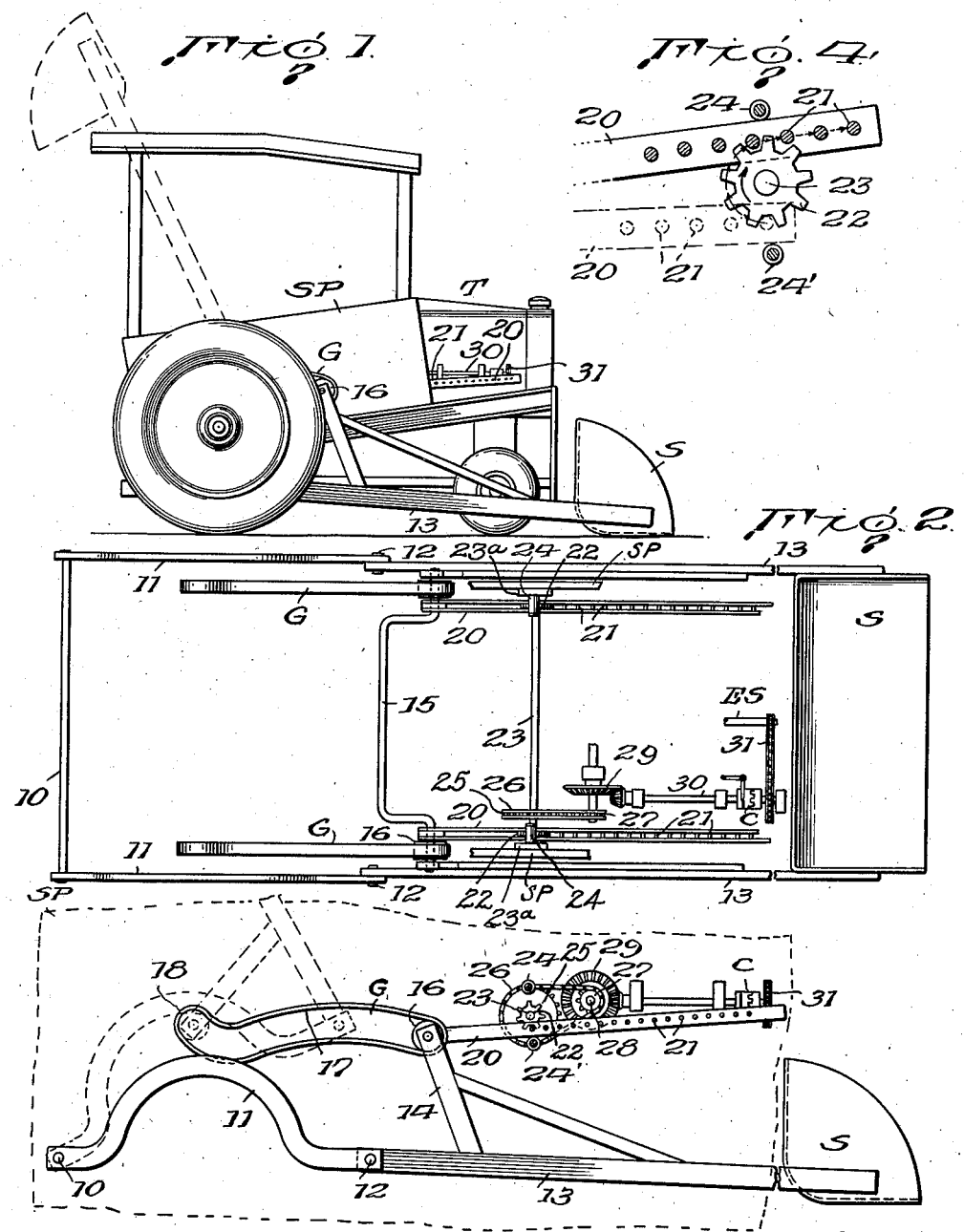
Inventor
DAVID H. LITTLETON, DECEASED,
BY CORA LITTLETON, ADMINISTRATRIX,
By Wm D. Hodges
Attorney Patented Feb. 4, 1941

2,230,755

UNITED STATES PATENT OFFICE 2,230,755

MATERIAL HANDLING APPARATUS

David H. Littleton, deceased, late of Whitlock, Tenn., by Cora Littleton, administratrix, Whitlock, Tenn., assignor to Bell Clay Company, St. Louis, Mo., a corporation of Missouri Application September 11, 1939, Serial No. 294,399

8 Claims. (Cl. 214—131)

This invention is a material handling device of the type in which a shovel-like element is utilized to elevate the material from a position at rest to a higher plane, and in such manner as to deposit it at the elevated position.

One of the objects of the invention is to provide an apparatus by which piled material may conveniently be loaded into cars, trucks or other convenient means of transportation, although not limited to this particular use. A further object is to provide a motor vehicle, equipped with a shovel element, and including means by which the shovel element may be readily manipulated in such manner as to elevate the load and to move it rearwardly, so that the elevated material may be discharged behind the vehicle at the end of the elevating movement. A further object is to provide a material-handling means of the character described, which may be readily attached to a motor vehicle of any kind, preferably a light tractor, and so arranged that the shovel element may be operated by means of power generated by the motor vehicle engine.

The invention will be hereinafter fully set forth and particularly pointed out in the claims.

In the accompanying drawing:

Figure 1 is a side elevation illustrating the handling device applied to a well known form of light tractor. Figure 2 is a top plan view with the apparatus detached from the tractor. Figure 3 is a side elevation of Figure 2. Figure 4 is an enlarged detail view of an actuator arm and a pinion drive therefor.

Referring to the drawing, T designates a motorized vehicle which may be of any desired construction, a well known commercial type of light tractor having been selected for purposes of illustration. Mounted in the frame of the tractor, near the rear end thereof is a support member which consists of a rock shaft 10, which is rotatively supported, and two forwardly projected side arms 11. Said side arms are arched, as shown, to pass over the rear axle of the tractor unit, although it is obvious that these arms may be straight if the structure of the tractor will permit it. Pivotally connected to the forward ends of the arms 11, at the points 12, are the rearwardly extended arms 13 of a shovel member S, which latter extends between and fixedly connects the forward ends of said arms 13.

Extended upwardly and rearwardly from the arms 13 are actuator members 14 for the shovel member, the upper ends of which are connected by a cross arm 15. Rotatively supported by said cross arm are guide rollers 16, located and arranged to travel within guide slots G formed in suitable side plates SP, which for convenience, may be sides of the tractor casing. It will be noted that the slot G is provided with a rearwardly and downwardly extended arcuate portion 17, which terminates in an upwardly and rearwardly offset extension 18. The arms 13 and the guide members 14 may be braced in any suitable or desired manner, so as to fixedly connect them in such manner as to prevent relative movement thereof.

Secured to the respective guide rollers 16 are the forwardly projected actuator arms 20, which carry inwardly projected pins 21. Said actuator arms are reciprocated by means of pinions 22, carried by a transversely disposed shaft 23 which is rotatively supported in suitable bearings 23ª, which are supported by the side plates SP. In Figure 2 the side plates SP are omitted except as indicated by the guides G and short broken-away portions which support the bearings 23ª. The up and down movements of the actuator arms are limited by stops 24 and 24', preferably in the form of rollers.

The shaft 23 is rotated by means of a sprocket wheel 25, connected by a chain 26 with a second sprocket wheel 27 which is carried by the shaft 28 of a ring gear 29, which latter is actuated by a shaft 30. Said shaft 30 may be connected with the engine shaft ES in any suitable manner, as by means of a sprocket gear arrangement 31, a suitable clutch C being interposed to make or break the connection with the power, as may be desired.

In operation, the shovel element is dropped to the position indicated in Figure 3, and the tractor is propelled forwardly so as to drive the shovel into the piled material. At this time the racks are resting upon stops 24' and in a plane below the plane of the axis of the pinions 22. Thereupon, the shaft 30 is clutched to the engine power, whereupon the pinions 22 are caused to rotate, thereby propelling the actuator arms rearwardly. As the actuator arms continue their travel, the rollers 16 are caused to follow the arcuate course defined by the slots 17, thereby raising the shovel S to a vertical position, this movement being permitted by reason of the pivotal support of the rock shaft 10, the pivot 11, and the rotative support of the rollers. As the power continues to move the actuator arms 21 rearwardly, the rollers 16 are eventually forced into the offset portions 18 of the slots, which will bring the shovel to the position indicated in dotted lines and tilted to such an angle as to discharge the load into a waiting conveyance stationed behind the tractor T, or to an elevated platform or storage bin, as the case may be. It will be observed that during its travel the shovel S follows a path over the top of the tractor and to the rear thereof. The pinions 22 continue their rotation and while still engaged with the rack bars, cause the rear ends of said rack bars to move upwardly until engaged with stops 24, whereupon the actuator members will start their return or forward travel, causing the rollers to retrace their paths through the slots 17, thereby moving the shovel forwardly over the tractor and downwardly to a horizontal position, ready to receive the next load. As the rack bars reach the limit of their forward travel the pinions will carry their face ends downwardly, to their original positions, resting upon stops 24'. These movements are produced by continuous rotations of the pinions 22 in one direction.

The advantages of the invention will be readily apparent to those skilled in the art to which it belongs. For instance, it will be observed that a very simple and efficient apparatus is provided, by means of which substantial quantities of piled material may be conveniently elevated by means of the shovel, and delivered from the latter at a position to the rear of the tractor. A further advantage is that the device is of simple and inexpensive construction and is of a character which may be readily atached to a motor vehicle and operatively connected with the engine thereof.

Having thus explained the nature of the invention and described an operative manner of constructing and using the same, although without attempting to set forth all of the forms in which it may be made, or all of the forms of its use, what is claimed is:

1. A material handling apparatus comprising a pivotally mounted support member, a shovel member pivotally connected to the support member, guide means, an angularly disposed actuator member fixedly secured to the shovel member and having an end in engagement with said guide means, and means for imparting forward and rearward movements to the actuator member with respect to said guide means, the latter including means for imparting arcuate movements to said end of the actuator member during said forward and rearward movements.

2. A material handling apparatus comprising a pivotally mounted support member, a shovel member pivoted to the support member, an actuator member for the shovel member fixedly secured thereto in such manner as to prevent relative movement thereof, a guide roller connected with the upper end of the actuator member, guide means engaging said roller, and means for imparting forward and rearward movements to said roller and actuator member with respect to said guide means, the latter including means for imparting arcuate movements to the roller during said forward and rearward movements.

3. A material handling apparatus comprising a pivotally mounted support member, a shovel member pivoted to the support member, an actuator member for the shovel member fixedly secured thereto in such manner as to prevent relative movement thereof, a guide roller connected with the upper end of the actuator member, a rack bar connected with said roller, guide means engaging said roller, a drive gear engaging said rack bar, means for imparting forward and rearward rotative movements to said drive gear in a manner to impart corresponding reciprocative movements to the rack bar, and means for limiting up and down movements of the rack bar during said forward and rearward movements thereof, said guide means including means for imparting arcuate movements to said guide roller during said forward and rearward movements.

4. A material handling apparatus comprising a pivotally mounted support member having forwardly extended arms, a shovel having rearwardly extended arms pivotally connected with the forward ends of said first mentioned arms, guide means for each of said shovel arms, angularly disposed actuator members fixedly secured to the respective shovel arms and each having an end in engagement with guide means, and means for imparting forward and rearward movements to said ends of the actuator members, said guide means including means for imparting arcuate movement to said ends during said forward and rearward movements.

5. A material handling apparatus comprising a pivotally mounted support member having forwardly extended arms, a shovel having rearwardly extended arms pivotally connected with the forward ends of said first mentioned arms, actuator members fixedly connected to the respective shovel arms in such manner as to prevent relative movement thereof, guide rollers carried by the upper ends of said actuator members, rack bars secured to said rollers, means for imparting forward and rearward movements to said rack bars in such manner as to impart corresponding movements to said rollers, said guide means including means for imparting arcuate movements to said rollers during said forward and rearward movements.

6. A material handling apparatus comprising a pivotally mounted support member having forwardly extended arms, a shovel having rearwardly extended arms pivotally connected with the forward ends of said first mentioned arms, actuator members fixedly connected to the respective shovel arms in such manner as to prevent relative movement thereof, guide means engaging the upper ends of the actuator members, rack bars connected with the upper ends of said actuator members, drive gears engaging said rack bars, means for imparting rotative movements to the drive gears in such manner as to impart forward and rearward movements to the rack bars, said guide means including means for imparting arcuate movements to the upper ends of said actuator members during said forward and backward movements.

7. A material handling apparatus comprising a pivotally mounted support member having forwardly extended arms, a shovel having rearwardly extended arms pivotally connected with the forward ends of said first mentioned arms, actuator members fixedly connected to the respective shovel arms in such manner as to prevent relative movement thereof, guide means provided with arcuate slots each having an upwardly offset portion at its rear end, means carried by the upper ends of the actuator members for engaging said arcuate slots, and means for imparting forward and rearward movements to the upper ends of the actuator, said slots being so shaped as to control the path of travel of said actuator members.

8. A material handling apparatus comprising a pivotally mounted support member having forwardly extended arms, a shovel having rearwardly extended arms pivotally connected with the forward ends of said first mentioned arms, actuator members fixedly connected to the respective shovel arms in such manner as to prevent relative movement thereof, guide plates having slots therein, said slots being of arcuate form each having an upwardly offset portion at its rear end, guide rollers carried by said actuator members and arranged to travel in said slots, rack bars connected with said rollers, and means for imparting forward and rearward movements to the rack bars in such manner as to cause the rollers to travel forwardly and rearwardly within said slots.

CORA LITTLETON,
*Administratrix of the Estate of David H. Littleton, Deceased.*